(12) United States Patent
Takahashi

(10) Patent No.: US 6,643,364 B1
(45) Date of Patent: Nov. 4, 2003

(54) PROVIDING TELEPHONY SERVICES

(75) Inventor: Richard J. Takahashi, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/572,346

(22) Filed: May 17, 2000

(51) Int. Cl.[7] .............................................. H04M 3/42
(52) U.S. Cl. .................. 379/201.05; 709/219
(58) Field of Search .................... 709/219; 379/201.05, 379/201.07, 201.08

(56) References Cited

U.S. PATENT DOCUMENTS

| | | | |
|---|---|---|---|
| 5,761,280 A | 6/1998 | Noonen et al. | 379/93.27 |
| 5,805,587 A | * 9/1998 | Norris et al. | 370/352 |
| 5,987,508 A | * 11/1999 | Agraharam et al. | 709/217 |
| 6,009,469 A | 12/1999 | Mattaway et al. | 709/227 |
| 6,134,319 A | * 10/2000 | Burg et al. | 379/354 |
| 6,141,413 A | * 10/2000 | Waldner et al. | 379/88.17 |
| 6,484,263 B1 | * 11/2002 | Liu | 713/201 |

FOREIGN PATENT DOCUMENTS

| | | |
|---|---|---|
| EP | 0 693 859 A2 | 1/1996 |
| EP | 0 833 488 A1 | 4/1998 |
| WO | WO 98/30008 | 7/1998 |

OTHER PUBLICATIONS

Nobel, Carmen, "Lucent, Rockwell Unveil DSL Chip Sets," PC Week Online, May 7, 1998.
"High–Density, Low–Power Octal ADSL Chipset Access-Runner™ 9009," Conexant Systems, Inc., 2000.
"DSP1690 ADSL Chip Set UAWG ADSL & V.90 Modem Chip Set with PCI–Bus Interface," Lucent Technologies, Microelectronics Group, Product Note, May 1998, PN98–153DMOD, WildWire™.

* cited by examiner

*Primary Examiner*—Ahmad F. Matar
*Assistant Examiner*—Quynh H. Nguyen
(74) *Attorney, Agent, or Firm*—Trop, Pruner & Hu, P.C.

(57) ABSTRACT

A digital signal processor provides a variety of telephony services for a processor-based system. A standard telephone or speakerphone may be coupled to the processor-based system. Further, both ADSL and analog modem functionality, for communication with other processor-based systems, such as on a network, may be available in some embodiments. Additional graphical user interfaces may be supplied for enhanced communication of telephony services. Single or dual-line connection to the telephone network may be supported. The simultaneous operation of modem and telephony functions may also be possible in some embodiments.

17 Claims, 5 Drawing Sheets

PROVIDING TELEPHONY SERVICES

BACKGROUND

This application relates to computer systems and, more particularly, to systems that include telephony services.

The interrelation between computer systems and telephony services is not new. While telephones have been considered indispensable to businesses and consumers alike for some time, computer systems are only recently enjoying a status as an essential asset. Lower cost, increased availability, in educational markets, and easier-to-use software may all have contributed to the widespread acceptance of computers for a variety of applications.

Certainly, the popularity of the Internet has influenced the proliferation of computer use. A computer connected to the Internet actually competes with old-fashioned telephone use, as many transactions that were traditionally handled on the phone may today be serviced by filling out a form on a web page. Further, particularly for long-distance communication, email may offer a more economical choice for keeping in touch than a telephone.

Despite the competition between telephones and computer systems, the technologies provide synergies that make combining them logical. Whether to make a telephone call or to log onto a network, a central office of the telephone system is typically invoked to transmit voice and/or data to the intended recipient, a person at a remote phone, or a user at a remote computer.

Computer systems may be connected to a network using coaxial cables or optical cables instead of using regular telephone lines. However, the old-fashioned telephone lines may be preferred, as phone system connections are typically found in most office and home environments, and may even be expected in hotels by the business traveler.

By simply loading a few software programs, a computer system with a modem, a speaker, and a microphone may send and receive phone calls or may operate as answering machines for a user.

However, the "telephony functions" of the computer system may not typically operate while the computer system is sending or receiving data using the modem. Likewise, the computer system may not typically download a web page while the phone is in use.

Thus, there is a continuing need for a computer system which supports network and telephony services and which allows simultaneous operation of these services.

DETAILED DESCRIPTION

In accordance with several embodiments described herein, a variety of telephony services may be used in a processor-based system. A standard telephone or speakerphone may be coupled to the processor-based system in some embodiments. Further, both asymmetric digital subscriber line (ADSL) and high-speed analog modem functionality, for communication with other processor-based systems, may be available in some embodiments. The simultaneous operation of modem and telephony functions may also be possible.

Figure 1:
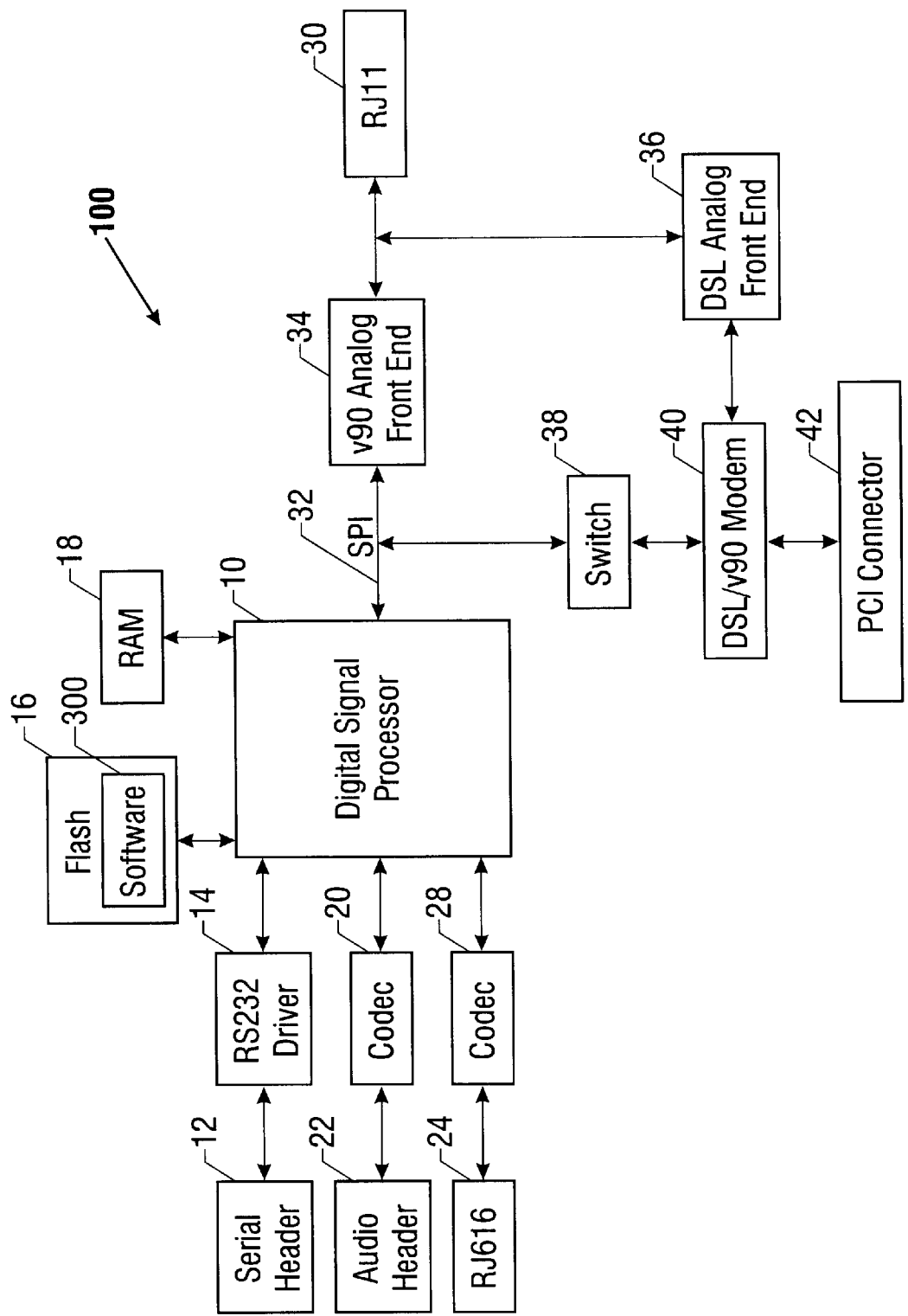
FIG. 1 is a block diagram of a system according to one embodiment of the invention.

In FIG. 1, a system 100 includes a digital signal processor (DSP) 10, for providing many of the telephony features described herein. The DSP 10 is supported by a flash memory 16 and a random access memory (RAM) 18, coupled directly to the DSP 10. The DSP 10 may be supported by software 300, stored permanently in the flash memory 16, and loadable to the RAM 18. The DSP 10 thus includes both hardware and software for flexible telephony support.

In one embodiment, the system 100 is a stand-alone board, connectable to a processor-based system. A peripheral component interconnect (PCI) connector 42 is supplied on the system 100 for establishing this connection. The PCI specification, version 2.1, is available from the PCI Special Interest Group, Portland, Oreg. 97214 (June, 1995).

Further, the system 100 includes one or more RJ 11 phone jacks 30, for connection to a telephone network. (RJ stands for registered jack.) In one embodiment, two distinct lines to the telephone network are available. For connecting to a standard telephone, the system 100 further supplies a RJ 616 phone jack 24. A specification, entitled "Dimensional, Mechanical, and Electrical Characteristics Defining Phone Plugs and Jacks," is published by the Electronics Industries Association (EIA) (1982).

In one embodiment, the DSP 10 interfaces between the standard telephone and the telephone network to provide enhanced telephony services. As such, the system 100, using the DSP 10, supplies the signals, tones, and other indicia to the telephone unit that would ordinary be supplied by the telephone network itself in response to signals received from the telephone. After enhancements are made by the DSP 10, the signals from the telephone may be sent to the telephone network and further processed in an expected manner. Some possible enhancements using the DSP 10 are discussed further, below.

Likewise, in some embodiments, the system 100 may retrieve information from the telephone network, such as caller-ID, call waiting, call forwarding, and so on. This information may also be enhanced before being forwarded to the telephone unit, as desired.

Figure 2:
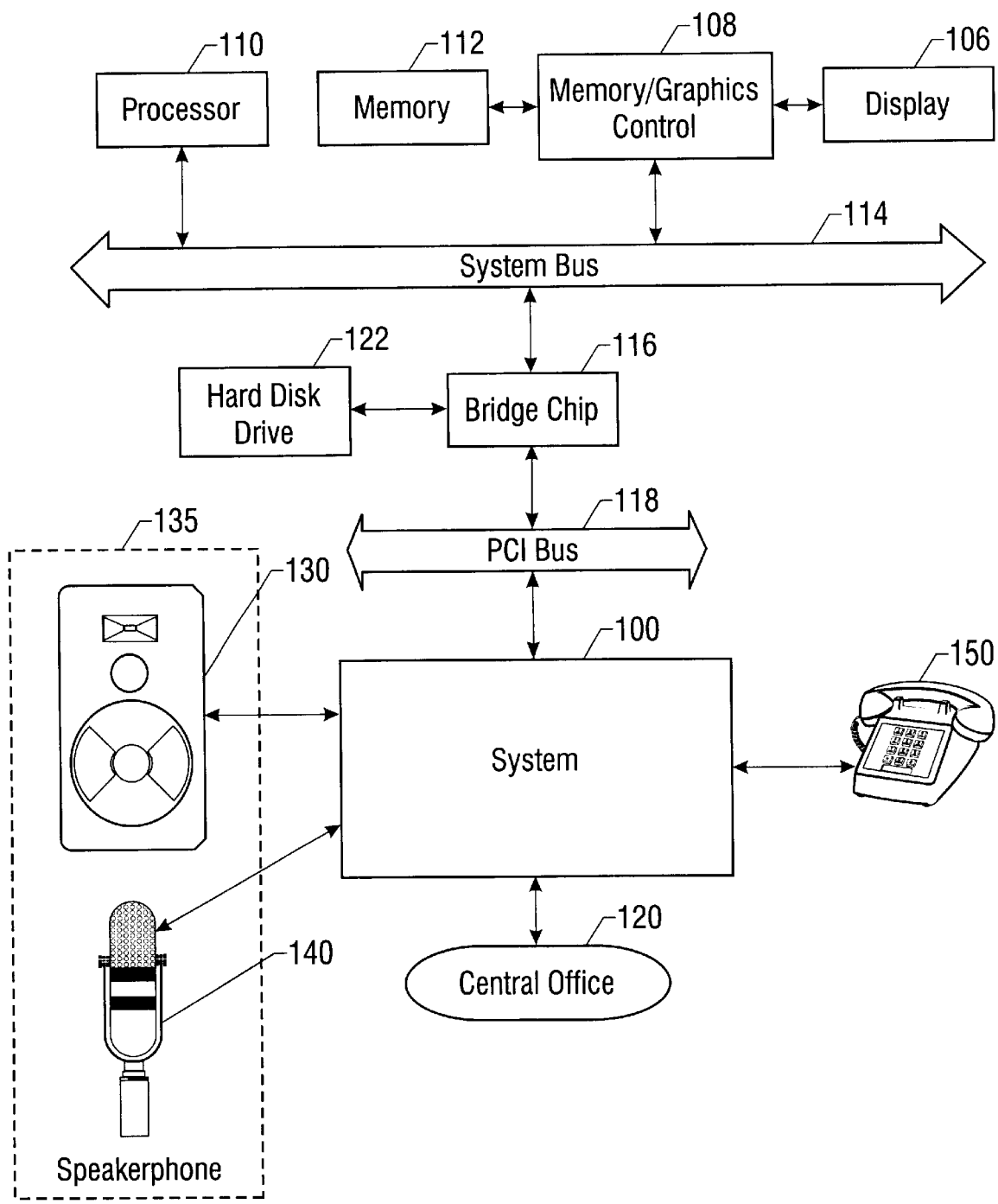
FIG. 2 is a block diagram of the system of FIG. 1 used in a computer system according to one embodiment of the invention.

In FIG. 2, the system 100 is part of a processor-based or computer system 200, such as an Internet appliance. The computer system 200 includes a processor 110 and a memory/graphics controller 108, coupled to a system bus 114. The memory/graphics controller 108 may support a system memory 112 and a display 106. A bridge chip 116 separates the system bus 114 from a peripheral component interconnect (PCI) bus 118.

The bridge chip 116 may support a non-volatile medium such as a hard disk drive 122, for storing operating system and other software programs, such as the software 300. In one embodiment, the system 100 is connected to the computer system 200 using the PCI bus 118.

With the system 100, the computer system 200 may be connected to a standard telephone unit 150, using the RJ 616 interface 24 (FIG. 1). Further, in one embodiment, a speaker 130 and a microphone 140, such as for a speakerphone 135, may be connected to the computer system 200 by the system 100. The system 100 further provides connection to a central office 120 of a telephone network, for processing incoming and outgoing telephone calls.

Besides connecting between the telephone unit 150 and the central office 120 of the telephone network, additional interfaces to the computer system 200 may be available from the system 100. Turning back to FIG. 1, according to one embodiment, the DSP 10 may be coupled to an RS 232 driver 14 and a serial header 12, for connection to a serial interface of the computer system 200, if desired. The serial header 12 allows data to be downloaded to the DSP 10, or, more specifically, to the flash memory 16, such as for upgrading the software 300 that supports the DSP 10.

The DSP 10 may further be coupled to a coder/decoder, CODEC, 20, and an audio header 22. In one embodiment, the audio header 22 is connected to the speaker 130 and the microphone 140, such as for a speakerphone 135 implementation of a telephony device. The audio header 22 may receive spoken commands from the microphone 140, and may translate those spoken commands into analog signals. The CODEC 20 may then convert the analog signals into digital form, for receipt by the DSP 10. Likewise, the CODEC 20 receives digitized data bits from the DSP 10 and may convert them into analog signals.

In one embodiment, the system 100 may be connected to the standard telephone 150, using the RJ 616 jack 24. Signals from the standard telephone through the RJ 616 jack 24 are sent to a subscriber line interface card (SLIC) 28. The SLIC 28 then connects to the DSP 10.

The SLIC 28 acts as an interface between the analog phone and the DSP 10. SLIC support is typically found at the central office of the telephone network. Functions such as battery feed, over-voltage protection, ringing, signaling, coding, hybrid, and testing, are typically supplied by the SLIC at the central office 120. These functions are well-known to system designers familiar with telephony.

However, according to one embodiment, the SLIC 28 emulates the central office 120 functions. The SLIC 28 emulation allows the system 100 to provide additional services during use of the standard telephone. For example, the DSP 10 may analyze the telephone number dialed, in order to provide additional services, before transmitting the telephone number to the central office 120 of the telephone network.

The system 100 may thus be connected to the serial interface of a processor-based system, for performing downloads and upgrades, or to the audio interface of the processor-based system, for receiving and transmitting, such as via the speakerphone 135. The RJ 616 interface 24 is also provided, for connecting to the standard telephone unit 150 as well as the RJ 11 interface 30, for connection to the central office 120 of the telephone network.

The system 100 further includes a serial protocol interface (SPI) for coupling the DSP 10 to modem circuitry. In one embodiment, the system 100 features a combination digital subscriber line (DSL) and v.90 modem 40 on the serial protocol interface. The DSL/v.90 modem 40 is a soft modem, supporting both digital subscriber line and standard analog modem technologies. The Alliance for Telecommunications Industry (ATI) standard, American National Standards Institute (ANSI) T1.413, is entitled "Telecommunications-Network and Customer Installation Interfaces-Asymmetric Digital Subscriber Line (ADSL) Metallic Interface" (1998).

In common parlance, a v.90 modem may support downstream transmission rates up to 56K. The International Telecommunications Union-Telecommunications Standardization (ITU-T) v.90 standard was published in September 1998. However, in one embodiment, the v.90 portion of the DSL/v.90 modem 40 may support lower transmission rates, as needed, for successfully communication with other modems on the telephone network. For example, a v.34 modem supports transmission rates between 38.8 kbps (kilobits per second) and 33.6 kbps (ITU-T Rec. v.34, February 1998).

Accordingly, the system 100 includes both a v.90 analog front end 34 and a DSL analog front end 36. System designers of ordinary skill recognize the analog front end as a standard interface between the telephone network and a digital signal processor supporting a modem. Analog front ends typically supply AC and DC termination, ringer impedance, lightning surge protection and isolation, as well as a host of other features.

In the embodiment of FIG. 1, both the v.90 analog front end 34 and the DSL analog front end 36 are programmable for use in a variety of operating environments. The two analog front ends 34 and 36 provide a programmable line interface to meet global telephone line interface requirements. In some embodiments, these front ends may be fully programmed to meet international requirements and thus be compliant with a variety of country-specific specifications. In one embodiment, the v.90 AFE 34 comprises a Silicon Laboratories Si 3034 Direct Access Arrangement (DAA) chipset. The DSL analog front end 36 may include digital filters, analog filters, digital-to-analog conversion circuitry, and various analog amplifiers.

In one embodiment, the selection of either v.90 or DSL modem support is controlled by a switch 38. When the switch 38 is in a first position, data coming in through the PCI connector 42 enters the SPI bus 32 and is transmitted through the v.90 analog front end 34 to the telephone network. Likewise, data received from the telephone network is processed by the v.90 analog front end 34.

When the switch 38 is in a second position, data received through the PCI connector 42 enters the modem 40 to instead be received by the DSL analog front end 36 and is then submitted to the central office 120 of the telephone network. Likewise, data sent from the central office 120 to the system 100 is processed by the DSL analog front end 36 as well as the DSL circuitry of the modem 40.

In some embodiments, both the DSL and the v.90 modem functionality may operate simultaneously. In FIG. 1, a single RJ 11 interface 30 is shown. However, the system 100 may support more than one interface 30, and thus more than one connection to the telephone network. In a two-line configuration, both the DSL and the v.90 modem functions may simultaneously operate. Thus, the system 100 may, either simultaneously or alternatively, support DSL and v.90 modem technologies.

In one embodiment, the DSL/v.90 modem 40 may be programmable to support either asymmetric digital subscriber line (ADSL) or splitterless DSL (also known as g-lite) technologies, as desired. The DSL technology is discussed in more detail, below.

Further, in one embodiment, the DSL/v.90 modem 40 may be programmable for international v.90-compliance. Where the phone line or service provider equipment fails to support v.90 operation, the v.90 modem function may successfully negotiate a lower data transfer connection rate. In addition to supporting the v.90 standard (56 kbps downstream and 33.6 kbps upstream, the DSL/v.90 modem 40 may support full-duplex transmission rates of 14.4 kbps (ITU-T Rec. v.32bis, 1991); 600/1200 bps (ITU-T Rec. v.23, November 1998); 1200 bps (ITU-T Rec. v.22, November 1998 and Bell 212A); 2400 bps (ITU-T Rec. v.22bis, November 1998); and 300 bps (ITU-T v.21, 1984 and Bell 103). Further, the DSL/v.90 modem 40 may perform error correction (ITU-T Rec. v.42 MNP 2–4, 1996) as well as data compression (ITU-T Rec. v.42 bis, MNP class 5, January 1990), to achieve higher data transmission rates.

For a standard telephone 150 connected to the RJ 616 interface 24, no modem support is necessary. Instead, as described in more detail, below, the DSP 10 may analyze incoming telephone numbers and provide support services associated with those telephone numbers.

In some embodiments, simultaneous operation of the modem 40 and the telephony services may be supported by the system 100. For systems supporting multiple connections to the telephone network, one line may be allocated to telephony services while a second line is dedicated to modem operation. However, even for systems 100 where only single connection to the telephone network is available, telephony services may be combined with the DSL modem support, as explained further below.

Figure 3:
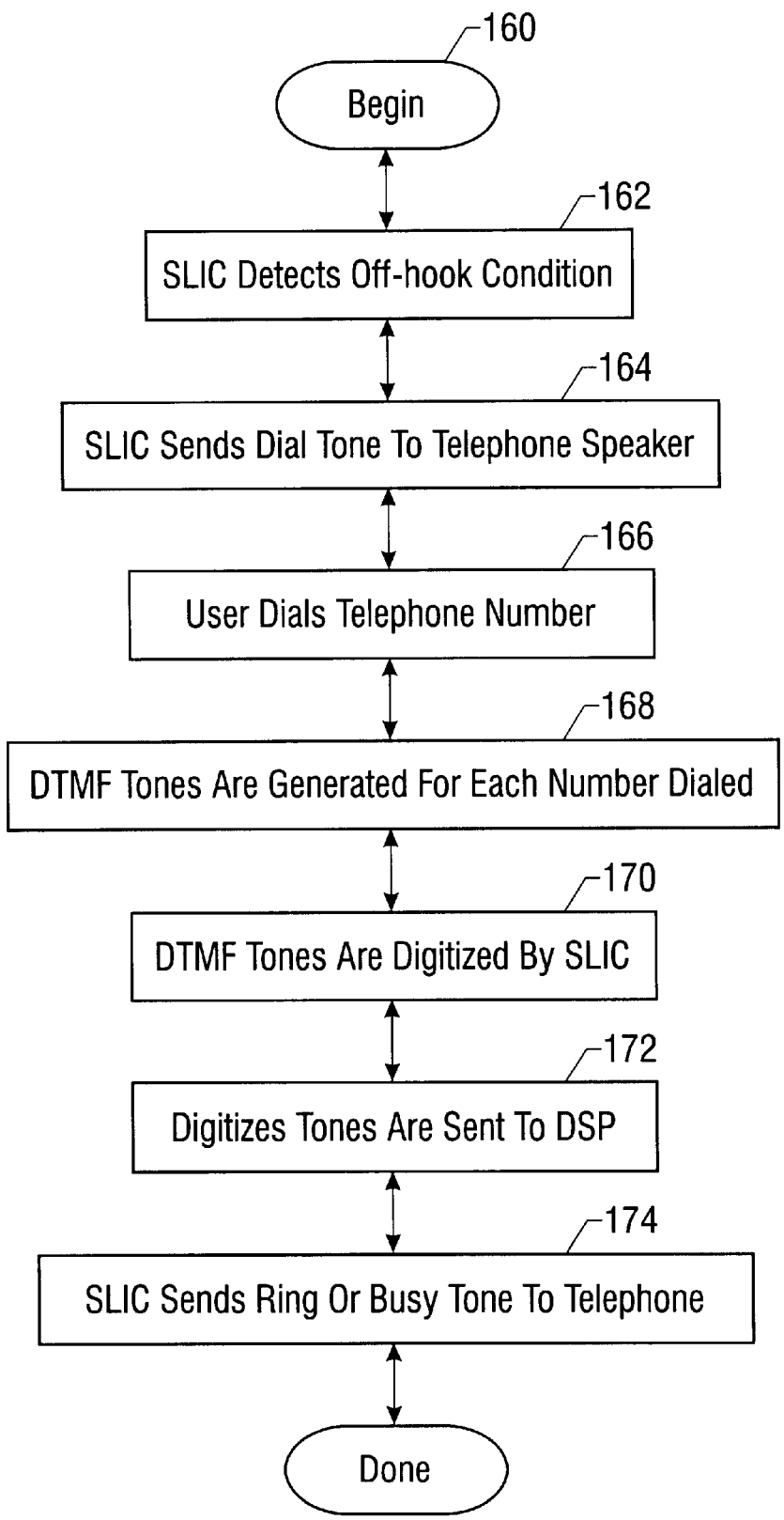
FIG. 3 is a flow diagram of operation of the system according to one embodiment of the invention.

In FIG. 3, the telephony operation of the system 100, according to one embodiment, begins when a telephone user lifts the handset of the telephone 150. First, the SLIC 28 detects an off-hook condition of the telephone 150 (block 162). The SLIC 28, emulating the central office 120 of the telephone network, sends a dial tone to a speaker of the telephone 150 (block 164). Alternatively, the dial tone may be sent by the SLIC 28 to the speaker 130, such as during operation of the speakerphone 135. As expected, the user next dials a telephone number (block 166).

When a telephone number is dialed, two separate tones are sent for each number. This is known as dual tone multi-frequency, or DTMF. Two DTMF tones are generated for each number dialed (block 168). The SLIC 28 receives these tones and digitizes them (block 170), then sends the tones to the DSP 10 (block 172). Finally, the SLIC 28 sends either a ring or a busy signal to the telephone 150 (block 174), indicating that the telephone number was received. Thus, the system 100, upon receiving a telephone number from the telephone unit 150, may successfully emulate operation of the central office 120.

Alternatively, the system 200 may include a graphical user interface (GUI) on the display 106 which enables a user to enter a telephone number from the GUI. Such a user interface may be supplied for use with the speakerphone 135 or as an enhancement to the standard telephone 150, as desired.

Before the SLIC 28 sends either a ring or a busy tone to the telephone 150, the DSP 10, according to one embodiment, may analyze the submitted telephone number in any of a number of ways. For example, In one embodiment, the DSP 10 may implement a "least cost routing" feature. This feature may be useful for long distance services, such as those that require that a particular number sequence be invoked to receive the service.

For example, upon receiving a particular number sequence, the DSP 10 recognizes the number sequence as a long distance service provider. Using the least cost routing feature, the DSP 10 may keep a database of competitive long distance provider phone numbers, along with the current long distance rates for each number. Alternatively, the information may be accessible to the DSP 10 from a remote location, such as on a server connected to the system 200, from a web page downloadable to a browser loaded on the system 200, or by other means.

According to one embodiment, if the long distance rate corresponding to the number received by the DSP 10 is higher than another long distance rate, the DSP 10 may replace the incoming number sequence with a number sequence corresponding to the lower data rate. The replacement number sequence may then be sent to the central office 120, just as though the replacement number sequence had been dialed from the telephone 150. Thus, a least cost routing feature may be provided using the system 100.

Alternatively, the DSP 10 may submit a message to the telephone unit 150, indicating that the number dialed is not the least cost alternative for long distance services. For example, the telephone unit 150 may include a light emitting diode (LED) display, for receiving messages from the DSP 10. In embodiments which utilize the GUI interface, the message from the DSP 10 may be submitted to the display 106. A number of other implementations for sending a message to the telephone user may be employed in support of the least cost routing feature.

In yet another embodiment, the DSP 10 may compare the incoming number sequence to a personal phone book of the user of the telephone 150. Where a number sequence has been misdialed, the DSP 10 may replace the misdialed number sequence with a number sequence as specified in the personal phone book. In this implementation, the criteria for determining how close the dialed number is to a personal phone book entry before being deemed "misdialed" may be programmable by the user or by the manufacturer of the computer system 200.

In yet another embodiment, the DSP 10 may compare the incoming number sequence, not to a personal phone book, but to a database of phone numbers, such as the entire phone directory of a particular community. For example, the DSP 10 may receive the first three numbers of the incoming phone number (e.g., an area code), and determine, based upon the number sequence, which database to retrieve. An item-by-item comparison of each entry in the database may be made by the DSP 10.

Where an entry identical to the number dialed is found, the DSP 10, according to some embodiments, may supply information related to the telephone number to the user. For example, a street address associated with the telephone number may be sent to the user. Such information may be presented in a number of ways, such as to an LCD display of the telephone unit 150 or to a GUI of the display 106.

Where an incorrect number sequence is discovered by the DSP 10, the entry may be corrected before being sent to the central office 120. Again, other pertinent information may be submitted to the telephone unit 150 or to the display 106, such as the address associated with the outgoing (changed) telephone number. Alternatively, the DSP 10 may simply submit an error report to the misdialer.

Figure 4:
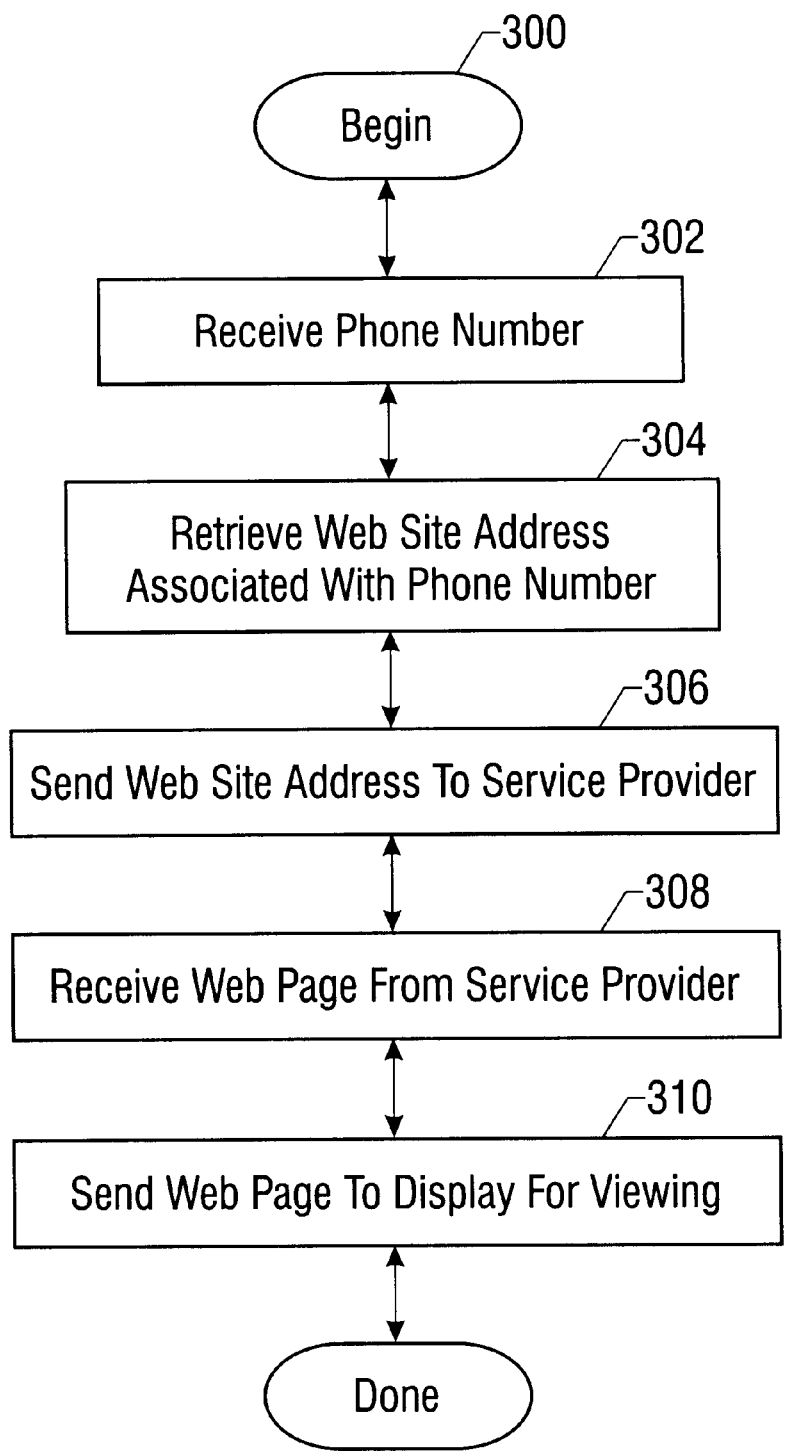
FIG. 4 is a flow diagram of the software operation according to one embodiment of the invention.

In yet another embodiment, in FIG. 4, the DSP 10 may associate the incoming telephone number sequence with an address such as a uniform resource locator (URL). For example, upon dialing a number associated with a business, a telephone user may see a web page associated with that business on the display 106. The DSP 10 analyzes the incoming telephone number to determine if an associated web page may be retrieved and displayed. In one embodiment, this operation is controlled by the software 300 which supports the DSP 10.

The operation of the software 300, according to the embodiment of FIG. 4, begins when the system 100 receives the phone number (block 302). A URL associated with the phone number is retrieved (block 304). For example, the software 300 may use the phone number as an index into a lookup table, which includes URLs associated with each phone number.

As with the least cost routing feature, the information may be static, such as a look-up table stored in the flash memory 16, or dynamic, such as a remotely-accessible web page which provides up-to-the-minute information services. Or, the DSP 10 may regularly download the information to local storage, such that the local information is relatively dynamic.

In one embodiment, the system 200 is connected to the Internet. Further, a browser program is loaded into the memory 112 and visible on the display 106 such that, once the URL is retrieved by the DSP 10, a web page may be downloaded to the display 106.

When the URL is sent to a service provider, such as an Internet service provider (ISP), the ISP then sends a web page associated with the URL to the system 200 (block 308). The web page may then be sent to the display 106 for viewing (block 310).

In retrieving the web page from the Internet, the system 100 employs the telephone network through the RJ 11 interface 30. This interface is likewise used for the outgoing telephone call. In some embodiments, the interface 30 connects to two separate telephone lines, both reaching the central office 120 of the telephone network, one for retrieving a web page and one for making a phone call.

However, the web page retrieval may also be implemented using the system 100 with but a single RJ 11 interface 30 to the telephone network. The simultaneous use of both the telephony and the modem features of the system 100 may, according to one embodiment, exploit the characteristics of ADSL technology, particularly when only a single-line connection to the central office 120 of the telephone network is available.

The asymmetric digital subscriber line (ADSL) technology allocates the substantial portion of a telephone wire's bandwidth that is not used for voice transmission. The transmission of voice signals employs only about 4 KHz of the bandwidth of the telephone wire. However, the telephone wire has a bandwidth that exceeds 1 MHz. Thus, the ADSL implementation allocates the first 6 KHz of a single telephone line to voice data and the remainder to high-speed data transmission. This high-speed data allocation is further divided into bandwidths for upstream and downstream data transmission. Thus, ADSL exploits the traditional analog telephone line such that data may be transmitted simultaneously with voice signals.

To use ADSL, an ADSL modem is supplied, both at the home or business and at the central office 120 of the telephone network. Increasingly, central office equipment includes ADSL modems. Thus, for many users, ADSL offers an opportunity to combine data transmission with telephony services.

Currently, ADSL is available in more than one configuration. For example, some implementations of ADSL require that a splitter be connected to the phone line, such that the voice and the data signals are separated from one another. Other implementations, such as g-lite, operate without a splitter, relying instead on the separation between the voice frequency range (0 to 6 KHz), and the data frequency range (6 KHz to 1104 KHz).

In the former implementation, higher-speed transmission may be possible. However, because less hardware is required, the latter implementation may be adequate for many uses. In any case, the DSP 10 of the system 100 may flexibly implement both DSL modem and telephony operations simultaneously, even when only a single telephone line is connected.

In another embodiment, the system 100 includes two RJ 11 interfaces 30 to the central office 120 of the telephone network; In this embodiment, the v.90 functionality of the DSL/v.90 modem 40 may be employed for sending a receiving data to and from the central office 120, while simultaneously performing telephony operations.

Further, by connecting the DSP 10 to the serial interface of the system 200, via the serial header 12, additional functionality of the DSP 10 may be provided, such as by upgrading the software 300. For example, in one embodiment, the system 100 does not support "voice over IP" services, such as are used to provide long distance services over the Internet. However, by a simple upgrade to the software 300, such functionality may readily be supplied to the DSP 10. The system 100 is thus a flexible peripheral system that may be added to a processor-based system to provide telephony and data transmission services well into the future.

Because of the ease with which telephony may be integrated with the computer system 200 using the system 100 of FIG. 1, the telephone unit 150 may be integrated with the hardware of the computer system 200. For example, in FIG. 5, a computer system 400 features a display 402 and a base unit 404. In one embodiment, the base unit 404 houses a system board, such as the system 200 of FIG. 2. Further, the display 402 houses a telephone handset 406 for performing telephony functions.

Figure 5:
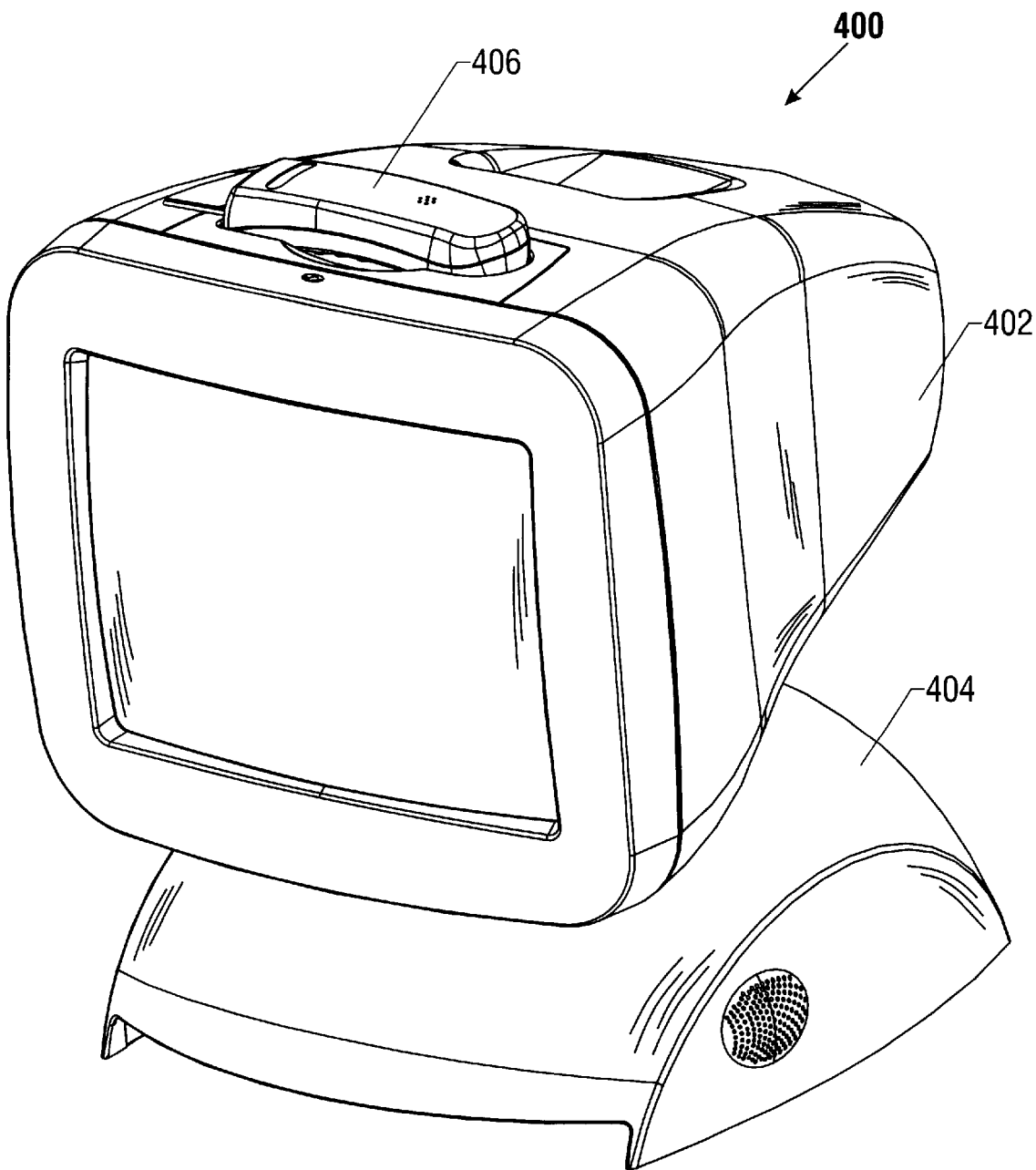
FIG. 5 is a system with telephony features according to one embodiment of the invention.

In the embodiment of FIG. 5, the simultaneous use of telephony and display services suggests a number of compatible functions that may be exploited, depending on user preferences. For example, instead of supplying URLs or web pages in conjunction with a phone number, a map of the region being called may be sent to the display 402. Alternatively, a list of businesses associated with the address may be supplied. The system 400 naturally lends itself to videophone technology, which may someday be available, as well.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method, comprising:

receiving information about a telephone number to which a telephone call is to be initiated;

associating a uniform resource locator with the telephone number;

retrieving a web page using the uniform resource locator; and transmitting the telephone number to a telephone network to initiate the telephone call.

2. The method of claim 1, further comprising:

sending the web page to a display.

3. The method of claim 1, associating a uniform resource locator with the telephone number further comprising:

accessing a table;

scanning the table for an entry comprising the telephone number; and retrieving a uniform resource locator from the entry.

4. A system, comprising:

a connection to a telephone network;

a second connection to a telephone unit;

a digital signal processor coupled between the connection and the second connection, wherein the digital signal processor is coupled to:

receive a telephone number to which a telephone call is to be initiated from the telephone unit;

associate a uniform resource locator with the telephone number;

retrieve a web page using the uniform resource locator; and transmit the telephone number to the telephone network to initiate the telephone call.

5. The system of claim 4, further comprising:

a third connection to a computer system; and a modem coupled to the third connection to send data across the telephone network.

6. The system of claim 5, wherein the digital signal processor is coupled to simultaneously trasmit the telephone number to the telephone network and send data across the telephone network.

7. The system of claim 5, wherein the digital signal processor is coupled to simultaneously transmit the telephone number to the telephone network and send data across the telephone network.

8. The system of claim 5, wherein the modem is an asymmetric digital subscriber line modem.

9. The system of claim 5, wherein the modem is an analog modem.

10. The system of claim 9, wherein the analog modem is coupled to transmit data at up to 56,000 bits per second.

11. An article comprising a medium storing a software program which, upon execution, causes a processor-based system to:

receive a telephone number to which a telephone call is to be initiated from a telephone unit;

associate a uniform resource located with the telephone number;

retrieve a web page using the uniform resource locator;

send the web page display; and transmit the telephone number to a telephone network to initiate the telephone call.

12. The article of claim 11, further storing a software program which, upon execution, causes a processor-based system to:

access a table;

scan the table for an entry comprising the telephone number; and retrieve a uniform resource locator from the entry.

13. The article of claim 11, further storing a software program which, upon execution, causes a processor-based system to:

analyze the telephone number;

identify a problem with the telephone number; and replace the telephone number with a second telephone number.

14. The article of claim 13, further storing a software program which, upon execution, causes a processor-based system to transmit the second telephone number to the telephone network.

15. The article of claim 13, further storing a software program which, upon execution, causes a processor-based system to send a message identifying the problem to the telephone unit.

16. The system of claim 4, wherein the digital signal processor is coupled to replace the telephone number with a second telephone number having a lower cost routing.

17. The system of claim 4, wherein the telephone unit includes an indicator to receive a message from the digital signal processor.

* * * * *